Oct. 12, 1948.   G. W. CARLSON   2,451,199
POWER SHAKER

Filed Dec. 22, 1944   3 Sheets-Sheet 1

INVENTOR
George W. Carlson
BY
William B. Jaspert
ATTORNEY

Oct. 12, 1948.          G. W. CARLSON          2,451,199
                         POWER SHAKER
Filed Dec. 22, 1944                         3 Sheets-Sheet 3

INVENTOR
George W. Carlson
BY
William B. Jaspert
ATTORNEY

Patented Oct. 12, 1948

2,451,199

UNITED STATES PATENT OFFICE 2,451,199

POWER SHAKER

George W. Carlson, Bridgeville, Pa., assignor to Burrell Technical Supply Company, Pittsburgh, Pa., a corporation of Pennsylvania Application December 22, 1944, Serial No. 569,331

2 Claims. (Cl. 74—42)

This invention relates to power shakers and it is among the objects thereof to provide a shaker for general purposes having a working shaft to which screens or other elements to be shaken are operatively connected, said shaft and operating mechanism including a motor being enclosed in a unitary housing of compact and durable form.

It is another object of the invention to provide a shaker mechanism in which the degree of vibration or oscillation is adjustable during the operation of the device.

It is still a further object of the invention to provide in conjunction with such adjusting means, means for indicating the degree of vibration of the shaker shaft.

Figure 1:
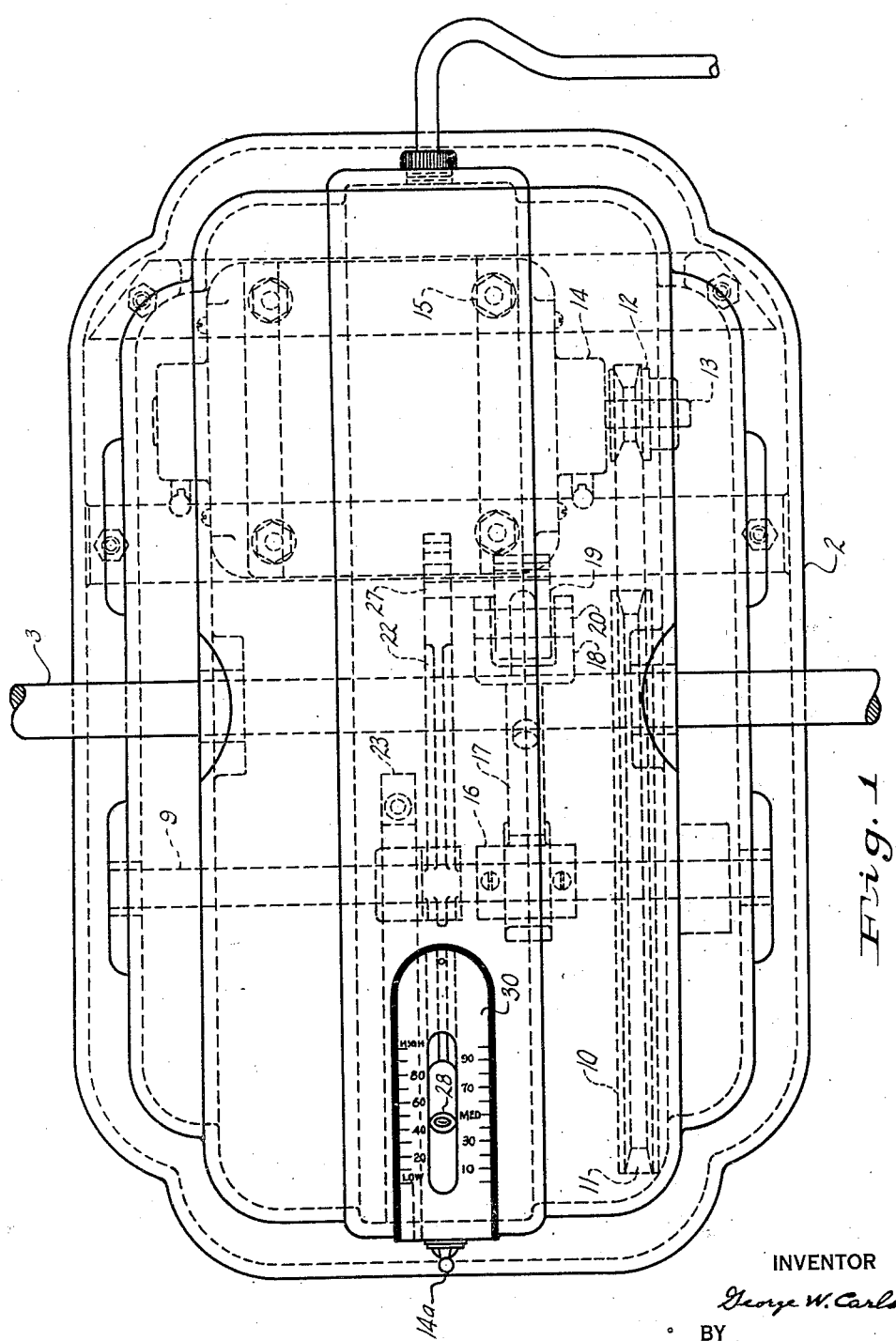
Figure 2:
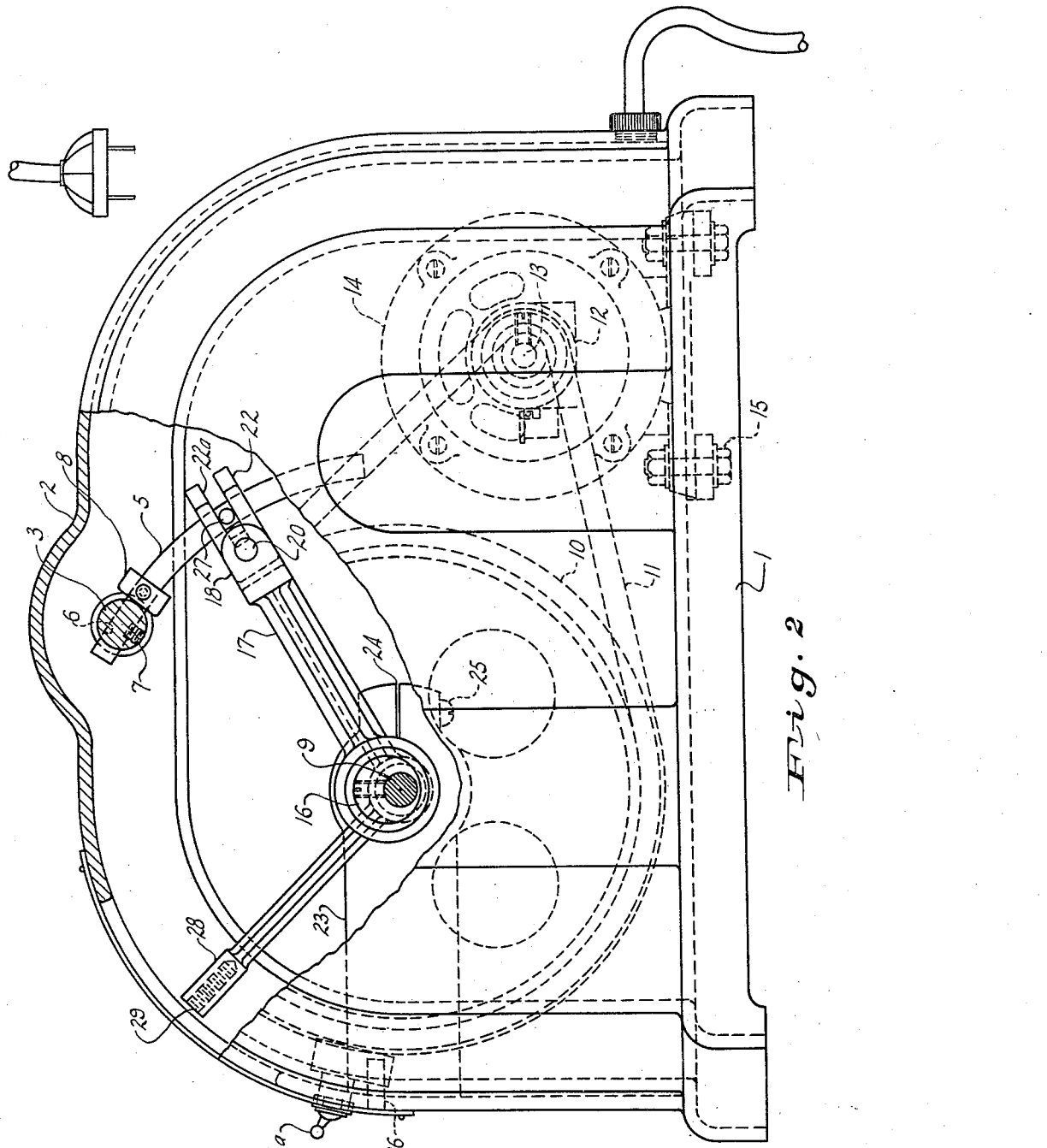

These and other objects of the invention will become apparent from a consideration of the accompanying drawings constituting a part hereof, in which Fig. 1 is a top plan view of a shaker embodying the principles of this invention;

Fig. 2 a side elevational view partially cut away, and

Figure 3:
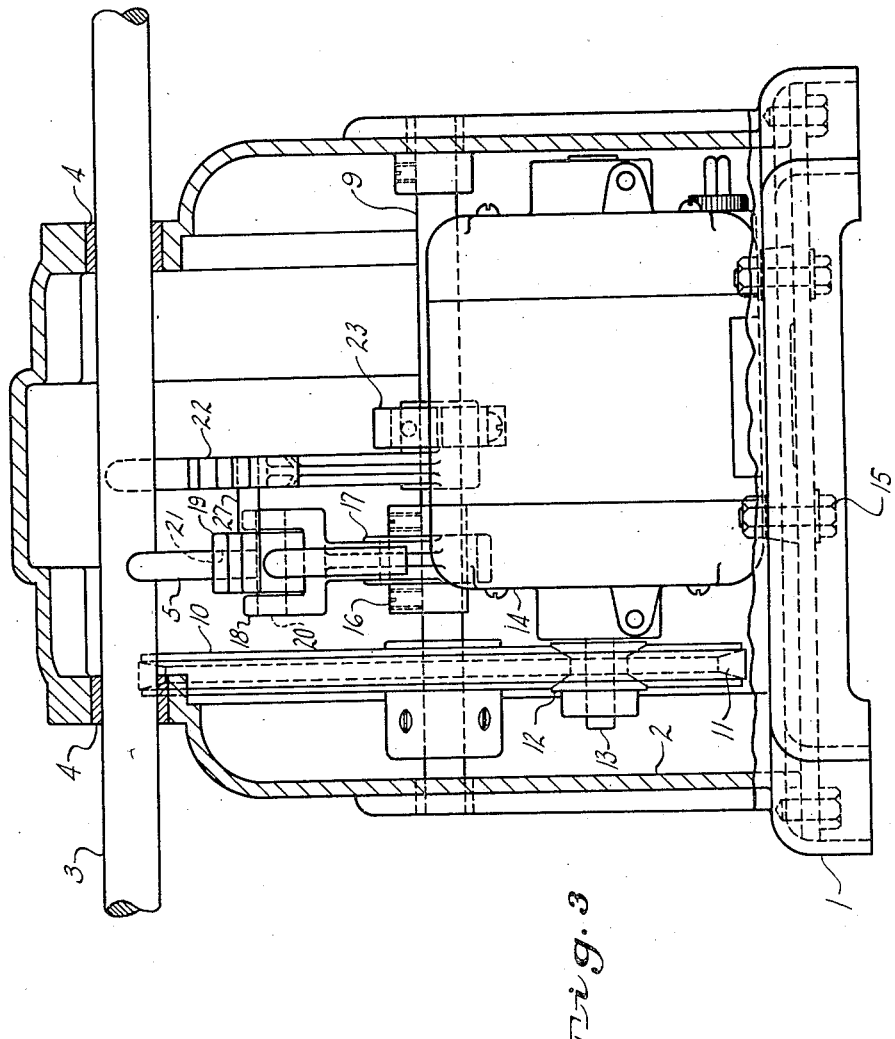

Fig. 3 an end elevational view partially in section with a part of the housing removed.

With reference to the several figures of the drawings, the structure therein illustrated comprises a base 1 on which is mounted a housing 2 for journaling a shaker shaft 3 in bearings 4. Shaft 3 is subjected to oscillatory movement angularly about its axis by an arm 5 extending through a drill hole 6 in the shaft 3 in which it is secured by a set screw 7.

An adjustable collar 8 is provided on the rocker arm 5 for a purpose to be hereinafter stated. Journaled in the housing 2 is a counter-shaft 9 having a sheave wheel 10 connected by a V-belt 11 to a pulley 12 mounted on shaft 13 of a motor 14 secured by bolts 15 to the base 1 of the housing. Mounted on the counter-shaft 9 is an eccentric 16 on which is mounted a connecting rod 17 having a bifurcated end 18 for receiving a connecting link 19 which is pivoted to the connecting rod by pin 20 and is provided with a transverse opening 21 for receiving the rocker arm 5 on which it is slidably mounted, the collar 8 of the rocker arm being adjusted to a position for limiting the position of the connecting link 19 to thereby limit the movement of the rocker arm 5. An adjustment arm consisting of a bell crank lever 22 is journaled on counter-shaft 9 and is engaged by a brake arm 23 having a split end 24 through which is passed an adjusting screw 25 by which the split end may be adjusted on the adjustment arm to frictionally engage the latter, the brake arm 23 being made of wood or other suitable material, and is secured against movement by a pin 26 extending through the housing 2 as shown in Fig. 2.

A pin 27 connects the adjusting arm 22 with the connecting link 19 and one end of the adjusting arm 22 is provided with an arm 28 which is provided with a threaded end 29 for receiving a knob that extends outside of the housing and which is provided with an indicator that registers with the calibrated graduations shown on the plate 30, Fig. 1. Movement of the bell crank adjusting arm 22 moves the connecting link 19 on the rocker arm 5 to vary the degree of oscillatory motion of the shaker shaft 3, the zero position being determined by placing the indicator on the zero end of the graduated scale 30, in which position the connecting link 19 is nearest the shaker shaft 3 and collar 8 is then moved to abut the connecting link end there fastened. Movement of arm 28 on the scale of the plate 30 will then lengthen the fulcrum point of arm 5 to decrease the shaking action.

The pin 27 is secured to the connecting link 19 and is freely disposed in a slot 22a of the adjusting arm 22 as shown in Fig. 2. The brake 23 on the adjusting arm eliminates vibration of the adjusting arm and rocker mechanism such as would result in chatter. The use of the friction brake eliminates the need for notches or stops and permits of finer increments of adjustment of the decrease of rocking of the rocker arm, which is desirable when the device is employed in chemical laboratories for agitating liquids.

The operation of the above-described mechanism is briefly as follows. The motor 14 is energized by a switch 14a, Fig. 2, to rotate sheave wheel 10 which operates counter-shaft 9. The eccentric 16 actuates the connecting rod 17 which causes the connecting link 19 to subject the rocker arm 5 to oscillatory movement which, in turn, rocks the shaker shaft 3. By adjusting the arm 28 of the bell crank lever 17, any predetermined degree of oscillatory movement may be obtained, such adjustment being made during the operation of the machine.

The above-described shaker mechanism is primarily intended for laboratory use as, for example, to shake bottles or vessels containing fluid that are thereby subjected to a desired degree of agitation. However, the apparatus may obviously have other applications for use in industry where a durable and simplified form of shaker mechanism is needed.

Although one embodiment of the invention has been herein illustrated and described, it will be evident to those skilled in the art that various modifications may be made in the details of construction without departing from the principles herein set forth.

I claim:

1. In a shaker mechanism, a shaker shaft, a counter-shaft, drive mechanism for the latter, a rocker arm secured to said shaker shaft, an eccentric on said counter-shaft, a connecting rod mounted to be actuated by said eccentric, a connecting link pivoted to the connecting rod and having sliding engagement with the rocker arm, said link having a pin extending therefrom and an adjustment arm having a bifurcated end disposed around said pin to change the relative position of the connecting link and rocker arm to thereby vary the rocking movement of said arm, said adjusting lever being provided with a prony brake to hold said adjustement arm in any given position.

2. In a shaker mechanism, a base and housing to constitute the same a self-contained unit, a shaker shaft journaled in said housing, a counter-shaft journaled in said housing, a motor mounted on the base of the housing, a sheave wheel mounted on the counter-shaft and a sheave wheel on the motor shaft having a V-belt connection therebetween, an eccentric on said counter-shaft having a connecting rod mounted to be actuated thereby, said connecting rod having a bifurcated end for receiving a connecting link pivotally mounted therein, said shaker shaft having a rocker arm disposed through an opening in said connecting link and an adjusting arm comprising a bell crank lever, an arm of which is provided with a bifurcated end for receiving a projection on said connecting link to adjust the position of said link relative to said rocker arm, and the other arm of said bell crank lever extending to a slotted opening in the housing in alignment with visible graduations to indicate the degree of adjustment effected by said arm, said adjusting arm being provided with friction means to maintain said arm in adjusted position, and said rocker arm having an adjustable stop to determine the zero position of said adjusting arm.

GEORGE W. CARLSON.

REFERENCES CITED

The following references are of record in the file of this patent:

UNITED STATES PATENTS

| Number | Name | Date |
|---|---|---|
| 677,316 | Lehrritter | June 25, 1901 |
| 907,736 | Card | Dec. 29, 1908 |
| 1,975,489 | Van Brunt | Oct. 2, 1934 |
| 2,019,582 | Racklyeft | Nov. 5, 1935 |
| 2,046,901 | Kirby | July 7, 1936 |
| 2,151,643 | Shu | Mar. 21, 1939 |